US008912724B2

(12) United States Patent
Son et al.

(10) Patent No.: US 8,912,724 B2
(45) Date of Patent: Dec. 16, 2014

(54) LED EMITTING DEVICE AND DRIVING METHOD THEREOF

(75) Inventors: Chan Son, Seoul (KR); Ilyong Jung, Bucheon (KR); Moonho Choi, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 48 days.

(21) Appl. No.: 13/570,628

(22) Filed: Aug. 9, 2012

(65) Prior Publication Data

US 2013/0038213 A1   Feb. 14, 2013

(30) Foreign Application Priority Data

Aug. 9, 2011 (KR) .................. 10-2011-0079270

(51) Int. Cl.
 *H05B 37/02* (2006.01)
 *H05B 33/08* (2006.01)
(52) U.S. Cl.
 CPC ........ *H05B 33/0812* (2013.01); *H05B 33/0848* (2013.01); *Y02B 20/341* (2013.01); *Y02B 20/346* (2013.01); *H05B 33/0815* (2013.01); *Y02B 20/343* (2013.01)
 USPC .......................................... 315/122; 315/210
(58) Field of Classification Search
 USPC .......... 315/122, 210, 291, 297, 307, 308, 313
 See application file for complete search history.

(56) References Cited

U.S. PATENT DOCUMENTS

| 7,276,861 | B1* | 10/2007 | Shteynberg et al. | 315/291 |
| 8,487,924 | B2* | 7/2013 | Jin et al. | 345/212 |
| 2010/0013395 | A1 | 1/2010 | Archibald et al. | |
| 2010/0110593 | A1* | 5/2010 | Kim et al. | 361/18 |
| 2011/0075462 | A1* | 3/2011 | Wildash | 363/127 |
| 2012/0286671 | A1* | 11/2012 | Shteynberg et al. | 315/151 |

OTHER PUBLICATIONS

Austriamicrosystems—AS3693C-9 Channel high precision LED driver for LCD Backlight, Aug. 13, 2009, Revision 1.4 pp. 1-30.

* cited by examiner

*Primary Examiner* — Daniel D Chang
(74) *Attorney, Agent, or Firm* — Okamoto & Benedicto LLP

(57) ABSTRACT

The present invention relates to an LED emitting device and a driving method thereof. The LED emitting device receives an input voltage and supplies a power supply voltage needed for operating an LED channel according to a switching operation of a power switch. The LED emitting device controls the power supply and also controls a load switch between the LED channel and an output voltage. The LED emitting device determines the LED channel to be short circuited when the output voltage is reduced to a predetermined threshold voltage during a predetermined short circuit sense period starting from the time when the output voltage reaches a regulated voltage before the LED channel is dimmed. During the short circuit sense period, the power supply is stopped and the load switch is turned on.

20 Claims, 4 Drawing Sheets

LED EMITTING DEVICE AND DRIVING METHOD THEREOF

CROSS-REFERENCE TO RELATED APPLICATION

This application claims priority to and the benefit of Korean Patent Application No. 10-2011-0079270 filed in the Korean Intellectual Property Office on Aug. 9, 2011, the entire contents of which are incorporated herein by reference.

BACKGROUND OF THE INVENTION (a) Field of the Invention

The present invention relates to an LED emitting device and a driving method thereof.

A light emitting device using LEDs (LED emitting device hereinafter) emits light with predetermined brightness by controlling a predetermined current to flow to an LED channel configured with a plurality of LEDs coupled in series. When current is supplied to the LED channel and light is output by the LED channel, the operation is called a dimming operation.

In the LED emitting device, a short circuit may occur between the LED channel and a sash forming an outer part of the LED emitting device. Before the dimming operation, there is no method for sensing the short circuit between the LED channel and the sash.

After the dimming operation begins, when an overcurrent caused by the short circuit between the LED channel and the sash flows to the sash through the LED channel, the short circuit may be sensed. During the dimming operation, the overcurrent damages the LED channel.

The overcurrent may be generated at the LED channel by the short circuit between the LED channel and another component as well as the short circuit between the LED channel and the sash.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an LED emitting device for sensing a short circuit of an LED channel before performing a dimming operation, and a driving method thereof.

An exemplary embodiment of the present invention provides an LED emitting device including: an LED channel; a power supply for receiving an input voltage and supplying a power supply voltage needed for an operation of the LED channel according to a switching operation of a power switch; a power controller for controlling the power supply; a load switch connected between the LED channel and the power supply; and a short circuit sense protector for determining the LED channel to be short circuited when an output voltage of the power supply is reduced to a predetermined threshold voltage for a predetermined short circuit sense period from a time when the output voltage reaches a regulated voltage before the LED channel is dimmed.

During the short circuit sense period, the power controller stops the power supply and the short circuit sense protector turns on the load switch.

The LED emitting device further includes: a first sense comparator for comparing a sense voltage corresponding to the output voltage and a first reference voltage corresponding to the regulated voltage; a second sense comparator for comparing the sense voltage and a second reference voltage corresponding to the threshold voltage; a first sense switch for controlling a connection between the first sense comparator and the sense voltage; and a second sense switch for controlling a connection between the second sense comparator and the sense voltage.

The short circuit sense protector turns on the first sense switch while the output voltage is generated to reach the regulated voltage, and it turns on the second sense switch during the short circuit sense period starting from the time when the output voltage reaches the regulated voltage.

The LED emitting device further includes: a feedback circuit for generating a feedback voltage by sensing a current flowing to the LED channel; and a dimming switch connected between the LED channel and the feedback circuit, wherein the short circuit sense protector maintains the dimming switch in a turn-off state before the LED channel is dimmed.

The short circuit sense protector controls the power controller to be operable according to a normal mode when the output voltage is greater than the threshold voltage during the short circuit sense period, and the power controller controls the power supply according to the feedback voltage in the normal mode.

The short circuit sense protector controls the power controller to be operable in a rise mode while the output voltage increases to reach the rated voltage, and in the rise mode, the power controller controls the power supply to increase the output voltage.

The short circuit sense protector turns on the first sense switch while the output voltage is generated to reach the regulated voltage, and it turns on the second sense switch during the short circuit sense period starting from the time when the output voltage reaches the regulated voltage.

The short circuit sense protector controls the power controller to be operable in the normal mode when the output voltage is greater than the threshold voltage, and the power controller controls the power supply according to the feedback voltage in the normal mode.

The power supply includes: an inductor for receiving the input voltage; a power switch having a first end connected to the inductor; and a diode connected to the power switch and the inductor, and the power controller stops the power switch during the short circuit sense period.

The power supply includes: a transfer switch for receiving the input voltage; and an output capacitor connected to the transfer switch and storing the output voltage, and during the short circuit sense period, the power controller stops the transfer switch.

Another embodiment of the present invention provides a method for driving an LED emitting device including an LED channel, including: receiving an input voltage and increasing an output voltage to a predetermined rated voltage; stopping a generation operation of the output voltage during a predetermined short circuit sense period starting from a time when the output voltage reaches the rated voltage; and dimming the LED channel or determining the LED channel to be in the short circuit state according to a result of comparing the output voltage and a predetermined threshold voltage during the short circuit sense period.

The LED channel is determined to be short circuited when the time for the sense voltage corresponding to the output voltage to reach the second reference voltage corresponding to the threshold voltage is within the short circuit sense period.

The LED channel is dimmed when the time for the sense voltage corresponding to the output voltage to reach the second reference voltage corresponding to the threshold voltage is not within the short circuit sense period.

The present invention provides an LED emitting device for sensing the short circuit of the LED channel, and a driving method thereof.

DETAILED DESCRIPTION OF THE EMBODIMENTS

Figure 1:
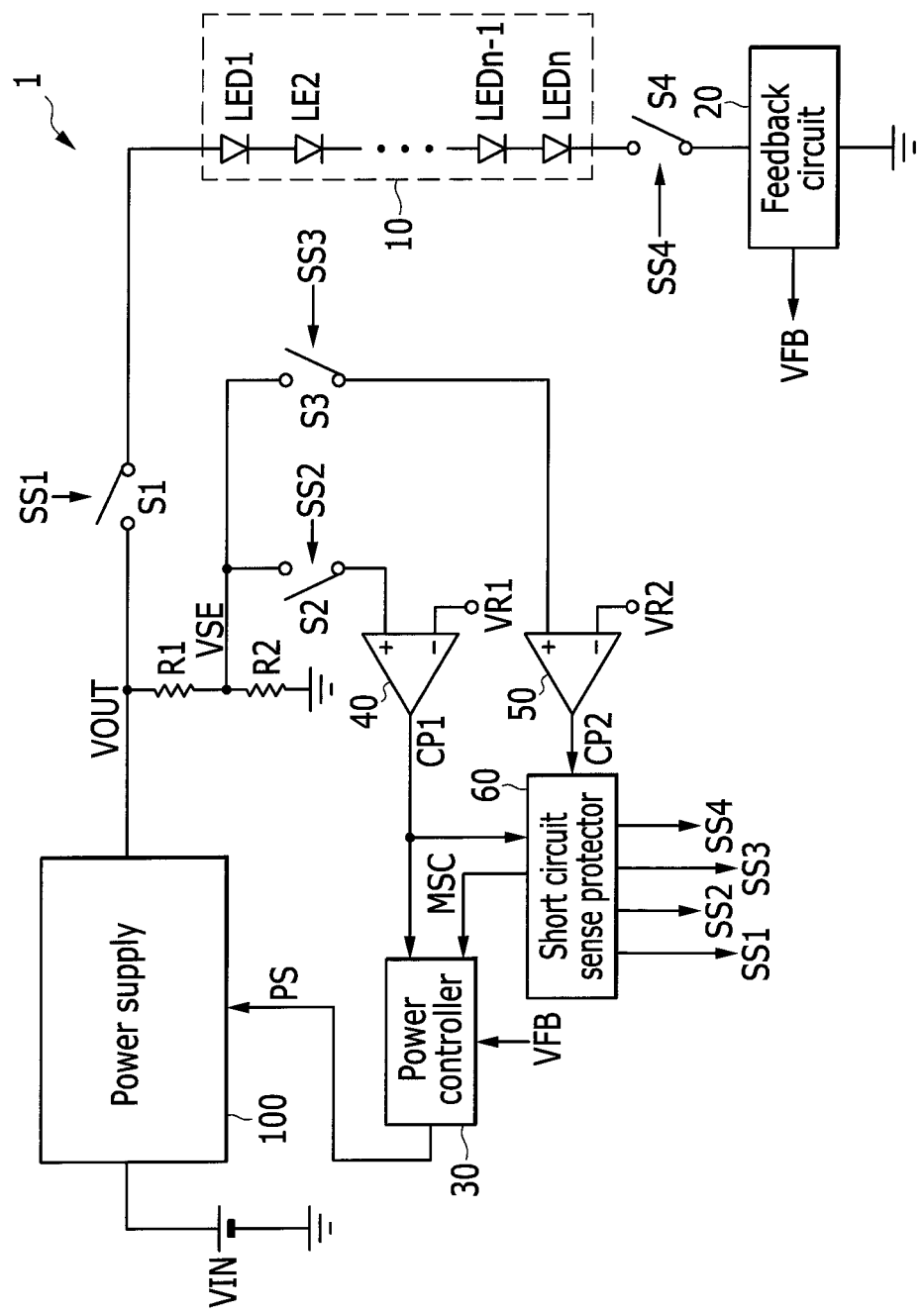
FIG. 1 shows an LED emitting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention are shown.

As shown in FIG. 1, an LED emitting device 1 includes an LED channel 10, a feedback circuit 20, a power controller 30, a first sense comparator 40, a second sense comparator 50, a short circuit sense protector 60, resistors R1 and R2, and a power supply 100.

The LED emitting device 1 includes a load switch S1 for sensing whether the LED channel 10 is short-circuited before dimming, a dimming switch S4, a first sense switch S2, and a second sense switch S3. An output voltage (VOUT) is divided by the resistor R1 and the resistor R2, and the short circuit sense protector 60 determines the short circuit state before the dimming process begins by using a voltage (hereinafter, sense voltage (VSE)) at a node (ND) to which the resistor R1 and the resistor R2 are connected.

The load switch S1 is connected between the power supply 100 and the LED channel 10. While the load switch S1 is turned on, the output power of the power supply 100 is transmitted to the LED channel 10, which is a load. While the load switch S1 is turned off, the output power of the power supply 100 is not transmitted to the LED channel 10.

The dimming switch S4 is connected between the LED channel 10 and the feedback circuit 20. While the dimming switch S4 is turned on, a current flows to the LED channel 10 to emit light, and while the dimming switch S4 is turned off, no current flows to the LED channel 10.

The first sense switch S2 is connected between the first comparator 40 and the node (ND), and a connection between a sense voltage (VSE) and the first sense comparator 40 is controlled by the first sense switch. The second sense switch S3 is connected between the second comparator 50 and the node (ND), and a connection between the sense voltage (VSE) and the second sense comparator 50 is controlled by the second sense switch S3.

The power supply 100 receives an input voltage (VIN) to generate the output voltage (VOUT). The power supply 100 can be realized with a switching regulator or a linear regulator.

The output voltage (VOUT) represents a power supply voltage for controlling the current to flow to the LED channel 10.

The LED channel 10 includes a plurality of LEDs (LED1-LEDn) that are connected in series.

The feedback circuit 20 senses the channel current flowing to the LED channel 10 to generate a feedback voltage (VFB) that corresponds to the channel current. While the output voltage (VOUT) of the power supply 100 is maintained (i.e., a normal operation period) after the short circuit state of the LED channel 10 is determined, the power supply 100 is controlled by the feedback voltage (VFB).

The power controller 30 controls the power supply 100 to maintain the output voltage (VOUT) at a voltage (hereinafter, rated voltage) in a level for operating the LED channel 10. The power controller 30 controls the power supply 100 according to a first comparing signal CP1 before dimming, and it controls the power supply 100 according to the feedback voltage (VFB) at the time when dimming begins.

The power controller 30 receives the first comparing signal CP1 variable by the output voltage (VOUT), the feedback signal (VFB), and a mode control signal (MSC) for controlling an operation mode of the power supply 100.

The power controller 30 is operable by a rise mode for increasing the output voltage (VOUT) to the rated voltage according to the mode control signal (MSC), a stop mode for stopping the switching operation during a predetermined short circuit sense period, and a normal mode for controlling the switching operation according to the feedback voltage (VFB).

In the rise mode, the power controller 30 generates a power control signal (PS) for increasing the output voltage (VOUT) to the rated voltage according to the first comparing signal CP1 and transmits the same to the power supply 100.

In the stop mode, the power controller 30 generates a power control signal (PS) for stopping the power supply 100. Therefore, the output voltage (VOUT) is reduced in the stop mode. Reduction of the output voltage (VOUT) during the short circuit sense period depends on the short circuit state of the LED channel 10, which will be described later with reference to FIG. 2.

In the normal mode, the power controller 30 generates a power control signal (PS) for maintaining the output voltage (VOUT) according to the feedback voltage (VFB) and transmits the same to the power supply 100.

The power supply 100 is controlled by the power control signal (PS).

The first sense comparator 40 compares the sense voltage (VSE) transmitted by the first sense switch S2 and a reference voltage VR1 to generate the first comparing signal CP1. The first sense comparator 40 includes an inverting terminal (−) for receiving the reference voltage VR1 and a non-inverting terminal (+) connected to a first end of the first sense switch S2.

The reference voltage VR1 is set to be the sense voltage (VSE) when the output voltage (VOUT) is a regulated voltage. The first sense comparator 40 generates a high-level comparing signal CP1 when the sense voltage (VSE) input to the non-inverting terminal (+) is greater than the reference voltage VR1 while the first sense switch S2 is turned on, and it generates a low-level comparing signal CP1 when the sense voltage (VSE) is less than the reference voltage VR1.

The second sense comparator 50 compares the sense voltage (VSE) transmitted by the second sense switch S3 and the reference voltage VR2 to generate a second comparing signal CP2. The second sense comparator 50 includes an inverting terminal (−) for receiving the reference voltage VR2 and a non-inverting terminal (+) connected to a first end of the second sense switch S3.

The reference voltage VR2 is set by the sense voltage (VSE) when the output voltage (VOUT) is a threshold voltage. The threshold voltage represents a voltage that is set to sense an abrupt reduction of the output voltage (VOUT) during the short circuit sense period when the LED channel 10 is short circuited.

The second sense comparator 50 generates a high-level comparing signal CP2 when the sense voltage (VSE) input to the non-inverting terminal (+) is greater than the reference voltage VR2 while the second sense switch S3 is turned on, and it generates a low-level comparing signal CP2 when the sense voltage (VSE) is less than the reference voltage VR2.

The short circuit sense protector 60 senses a short circuit of the LED channel 10 by using a change of the output voltage (VOUT) when the output voltage (VOUT) is supplied to the LED channel 10 before dimming. Also, the short circuit sense protector 60 controls a protection operation for stopping the operation of the power supply 100 when the LED channel 10 is determined to be in the short circuit state.

The short circuit sense protector 60 controls the load switch S1, the first sense switch S2, the second sense switch S3, and the dimming switch S4 so as to sense the short circuit state of the LED channel 10. Further, the short circuit sense protector 60 controls the operation mode of the power controller 30 before dimming.

In detail, the short circuit sense protector 60 generates a mode control signal (MSC) and transmits it to the power controller 30, and generates first to fourth switching control signals (SS1-SS4) to control the load switch S1, the first sense switch S2, the second sense switch S3, and the dimming switch S4.

While the power controller 30 controls the power supply 100 with a rise mode according to the mode control signal (MSC), the first sense switch S2 is turned on by the second switching control signal SS2 and the short circuit sense protector 60 controls the rise mode period according to the first comparing signal CP1.

That is, when the output voltage (VOUT) reaches the regulated voltage so the sense voltage (VSE) reaches the first reference voltage VR1, the first comparing signal CP1 becomes high level. The short circuit sense protector 60 generates a mode control signal (MSC) for stopping the rise mode when the first comparing signal CP1 becomes high level.

While the power controller 30 controls the power supply 100 with the stop mode according to the mode control signal (MSC), the second sense switch S3 is turned on by the third switching control signal SS3 and the load switch S1 is turned on by the first switching control signal SS1. That is, the second sense switch S3 and the load switch S1 are turned on.

In the stop mode, the short circuit sense protector 60 determines the short circuit state according to the second comparing signal CP2 in the short circuit sense period. When the sense voltage (VSE) becomes less than the second reference voltage VR2 within the short circuit sense period, the second comparing signal CP2 becomes low level. The short circuit sense protector 60 determines the LED channel 10 to be in the short circuit state when the second comparing signal CP2 becomes low level within the short circuit sense period.

The short circuit sense protector 60 determines the LED channel 10 to be in the short circuit state, and maintains the mode control signal (MSC) for stopping the power supply 100.

An operation of an LED emitting device according to an exemplary embodiment of the present invention will now be described with reference to FIG. 2.

Figure 2:
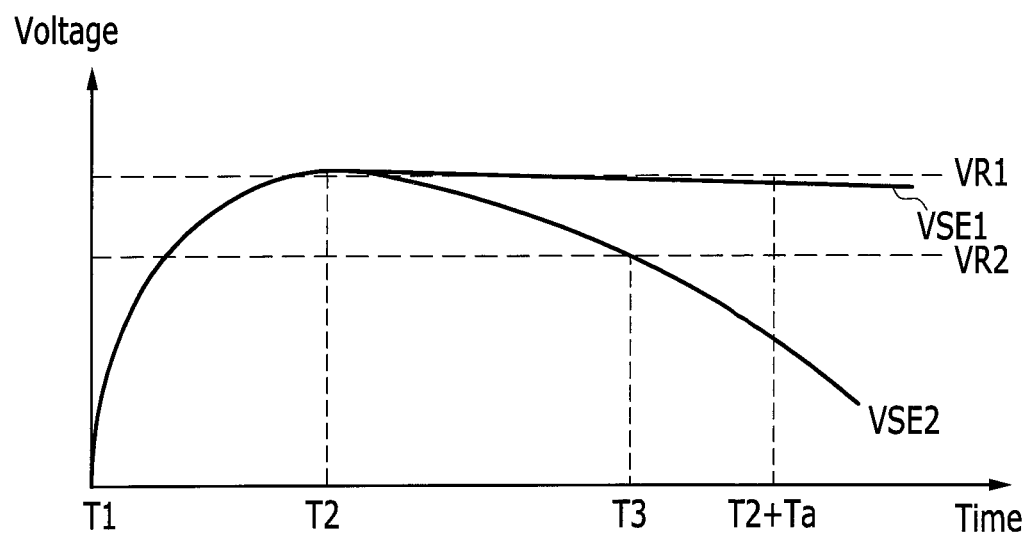
FIG. 2 shows a waveform diagram for showing a sense voltage before dimming of an LED emitting device according to an exemplary embodiment of the present invention.

FIG. 2 shows a waveform diagram for showing a sense voltage before dimming of an LED emitting device according to an exemplary embodiment of the present invention.

As shown in FIG. 2, the power controller 30 starts controlling the power supply 100 according to the mode control signal (MSC) at the time T1 before dimming.

During the periods T1 and T2, the power controller 30 controls the power supply 100 according to the rise mode to increase the output voltage (VOUT), and the sense voltage (VSE) is also increased. During the periods T1 and T2, the load switch S1, the dimming switch S4, and the second sense switch S3 are turned off and the first sense switch S2 is turned on.

When the sense voltage (VSE) reaches the first reference voltage VR1 at the time T2, the first comparing signal CP1 becomes high level. The short circuit sense protector 60 generates the mode control signal (MSC) for instructing the stop mode and transmits it to the power controller 30.

The power supply 100 does not generate output power after the time T2 according to the mode control signal (MSC).

The short circuit sense protector 60 generates a second switching control signal SS2 for turning off the first sense switch S2 and a third switching control signal SS3 for turning on the second sense switch S3 at the time T2. Further, the short circuit sense protector 60 generates a first switching control signal SS1 for turning on the load switch S1. The output voltage (VOUT) is connected to the LED channel 10.

When the LED channel 10 is connected to an external device such as a sash and is in the short circuit state, the output voltage (VOUT) is abruptly reduced after the time T2. As shown in FIG. 2, the sense voltage VSE2 represents a sense voltage when the LED channel 10 is short circuited.

A short circuit sense period (SSP) is set to be up to a period when a predetermined period Ta is passed from the time T2. The period Ta is set to be a period for determining the short circuit state of the LED channel 10.

When the reduced sense voltage VSE2 reaches the second reference voltage VR2 at the time T3, the second comparing signal CP2 becomes low level. The short circuit sense protector 60 determines it to be a short circuit state when the second comparing signal CP2 becomes low level within the short circuit sense period (SSP) and generates a mode control signal (MSC) for maintaining the operation of the power supply 100 at a normal state. Further, the short circuit sense protector 60 generates first to third switching control signals (SS1-SS3) for turning off the load switch S1, the first sense switch S2, and the second sense switch S3.

Since it is not dimmed, the dimming switch S4 is turned off. The short circuit sense protector 60 maintains a fourth switching control signal SS4 for turning off the dimming switch S4.

When the LED channel 10 is not in the short circuit state, the output voltage (VOUT) is gradually reduced by self discharge after the time T2. As shown in FIG. 2, the sense voltage VSE1 represents a sense voltage when the LED channel 10 is not short circuited, that is, when it is in the normal state.

During the short circuit sense period (SSP), the sense voltage VSE1 is greater than the second reference voltage VR2. Therefore, the second comparing signal CP2 is maintained at the high level. The short circuit sense protector 60 determines that the second comparing signal CP2 is high level within the short circuit sense period (SSP) to be the normal state, and it generates a mode control signal (MSC) for controlling the operation of the power supply 100 with the normal mode.

Also, the short circuit sense protector 60 generates second and third switching control signals SS2 and SS3 for turning off the first sense switch S2 and the second sense switch S3, and first and fourth switching control signals SS1 and SS4 for turning on the load switch S1 and the dimming switch S4. That is, the dimming operation begins from the time T2+Ta.

The short circuit of the LED channel before dimming can be sensed according to the exemplary embodiment of the present invention, thereby preventing the LED channel from being damaged by a short circuit after dimming.

Figure 3:
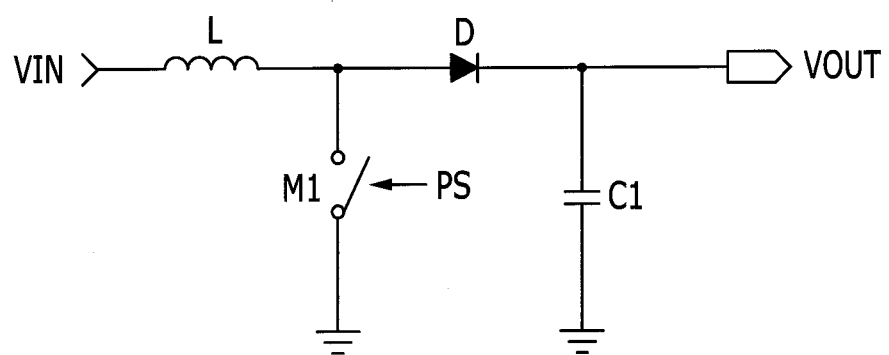
FIG. 3 shows a power supply according to an exemplary embodiment of the present invention.

FIG. 3 shows a power supply according to an exemplary embodiment of the present invention. As shown in FIG. 3, the power supply 100 can be realized with a switching regulator.

The switching regulator shown in FIG. 3 is realized with a boost converter, but the present invention is not restricted thereto, and other types of converters are applicable.

The power supply 100 includes a power switch M1, an inductor (L), a diode (D), and a capacitor C1.

The inductor (L) has a first end connected to the input voltage (VIN), and a second end connected to a first end of the power switch M1 and an anode of the diode (D). A capacitor C1 connected to a cathode of the diode (D) filters a ripple component of the output voltage (VOUT).

While the power switch M1 is turned on, the diode (D) is blocked and the inductor (L) stores energy. While the power switch M1 is turned off, the diode (D) is turned on and the energy stored in the inductor (L) is output to the outside of the power supply 100 through the diode (D).

The power switch M1 is controlled by the power control signal (PS). In the period in which the output voltage (VOUT) rises, the power controller 30 receives a first comparing signal CP1 and generates a power control signal (PS) for increasing a duty of the power switch M1. In the period in which the power supply 100 stops generation of the output voltage, a power control signal (PS) for stopping the power switch M1 is generated.

From the time when the LED channel 10 is determined to be not short circuited and the dimming operation begins, the power controller 30 generates a power control signal (PS) for maintaining the output voltage (VOUT) at a rated voltage according to the feedback signal (VFB).

Figure 4:
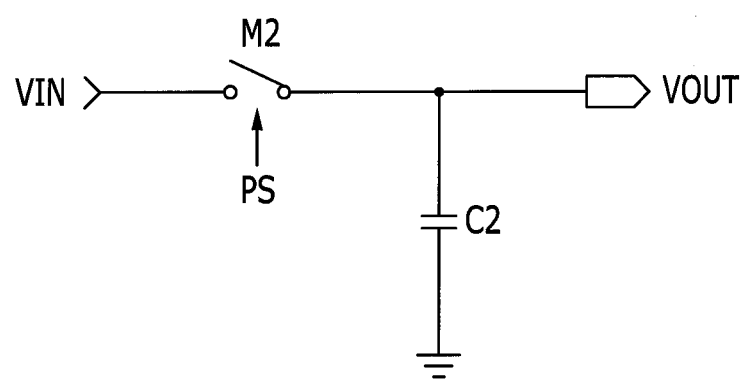
FIG. 4 shows another power supply according to an exemplary embodiment of the present invention.

FIG. 4 shows another power supply according to an exemplary embodiment of the present invention. As shown in FIG. 4, the power supply 100 can be realized with a linear regulator.

The power supply 100 includes a transfer switch M2 and a capacitor C2.

The transfer switch M2 has a first end connected to the input voltage (VIN) and a second end connected to the capacitor C2. The output capacitor C2 is charged by the current that is transmitted by the transfer switch M2, and the output capacitor C2 stores an output voltage (VOUT).

While the transfer switch M2 is turned on, the output capacitor C2 is charged. While the transfer switch M2 is turned off, the current needed for the load is supplied by the output capacitor C2.

The transfer switch M2 is controlled by the power control signal (PS). In the period in which the output voltage (VOUT) rises, the power controller 30 receives the first comparing signal CP1 and generates a power control signal (PS) for increasing a duty of the transfer switch M2. In the period in which the power supply 100 stops generation of the output voltage (VOUT), a power control signal (PS) for stopping the transfer switch M2 is generated.

From the time when the LED channel 10 is determined to be not short circuited and the dimming operation begins, the power controller 30 generates a power control signal (PS) for maintaining the output voltage (VOUT) at the rated voltage according to the feedback signal (VFB).

The drawings and the detailed description of the invention given so far are only illustrative, and they are only used to describe the present invention but are not used to limit the meaning or restrict the range of the present invention described in the claims. Therefore, it will be appreciated to those skilled in the art that various modifications may be made and other equivalent embodiments are available. Accordingly, the actual scope of the present invention must be determined by the spirit of the appended claims.

What is claimed is:

1. An LED emitting device comprising:
   an LED channel;
   a power supply for receiving an input voltage and supplying an output voltage needed for an operation of the LED channel according to a switching operation of a power switch;
   a power controller for controlling the power supply;
   a load switch connected between the LED channel and the output voltage; and
   a short circuit sense protector for determining the LED channel to be short circuited when the output voltage is reduced to a predetermined threshold voltage for a predetermined short circuit sense period from a time when the output voltage reaches a regulated voltage before the LED channel is dimmed,
   wherein during the short circuit sense period, the power controller stops the power supply by stopping the switching operation of the power switch and the short circuit sense protector turns on the load switch.

2. The LED emitting device of claim 1, further comprising:
   a first sense comparator for comparing a sense voltage corresponding to the output voltage and a first reference voltage corresponding to the regulated voltage;
   a second sense comparator for comparing the sense voltage and a second reference voltage corresponding to the threshold voltage;
   a first sense switch for controlling a connection between the first sense comparator and the sense voltage; and
   a second sense switch for controlling a connection between the second sense comparator and the sense voltage.

3. The LED emitting device of claim 2, wherein the short circuit sense protector turns on the first sense switch while the output voltage is generated to reach the regulated voltage, and it turns on the second sense switch during the short circuit sense period starting from the time when the output voltage reaches the regulated voltage.

4. The LED emitting device of claim 1, further comprising:
a feedback circuit for generating a feedback voltage by sensing a current flowing to the LED channel; and
a dimming switch connected between the LED channel and the feedback circuit,
wherein the short circuit sense protector maintains the dimming switch in a turn-off state before the LED channel is dimmed.

5. The LED emitting device of claim 4, wherein the short circuit sense protector controls the power controller to be operable according to a normal mode when the output voltage is greater than the threshold voltage during the short circuit sense period, and
the power controller controls the power supply according to the feedback voltage in the normal mode.

6. The LED emitting device of claim 5, wherein the short circuit sense protector controls the power controller to be operable in a rise mode while the output voltage increases to reach the rated voltage, and
in the rise mode, the power controller controls the power supply to increase the output voltage.

7. The LED emitting device of claim 4, further comprising:
a first sense comparator for comparing a sense voltage corresponding to the output voltage and a first reference voltage corresponding to the regulated voltage;
a second sense comparator for comparing the sense voltage and a second reference voltage corresponding to the threshold voltage;
a first sense switch for controlling a connection between the first sense comparator and the sense voltage; and
a second sense switch for controlling a connection between the second sense comparator and the sense voltage.

8. The LED emitting device of claim 7, wherein the short circuit sense protector turns on the first sense switch while the output voltage is generated to reach the regulated voltage, and turns on the second sense switch during the short circuit sense period starting from the time when the output voltage reaches the regulated voltage.

9. The LED emitting device of claim 8, wherein the short circuit sense protector controls the power controller to be operable in a normal mode when the output voltage is greater than the threshold voltage, and the power controller controls the power supply according to the feedback voltage in the normal mode.

10. The LED emitting device of claim 1, wherein the power supply includes:
an inductor for receiving the input voltage;
the power switch having a first end connected to the inductor; and
a diode connected to the power switch and the inductor,
wherein the power controller stops the switching operation of the power switch during the short circuit sense period.

11. The LED emitting device of claim 1, wherein the power supply comprises an output capacitor connected to the power switch and storing the output voltage, and wherein during the short circuit sense period, the power controller stops the switching operation of the power switch.

12. A method for driving an LED emitting device including an LED channel, comprising:
receiving an input voltage and increasing an output voltage to a predetermined rated voltage, the output voltage being generated according to a switching operation of a power switch;
stopping a generation operation of the output voltage by stopping the switching operation of the power switch during a predetermined short circuit sense period starting from a time when the output voltage reaches the rated voltage; and
dimming the LED channel or determining the LED channel to be in the short circuit state according to a result of comparing the output voltage and a predetermined threshold voltage during the short circuit sense period.

13. The method of claim 12, wherein the increasing an output voltage to the rated voltage includes:
increasing the output voltage until a sense voltage corresponding to the output voltage reaches a first reference voltage corresponding to the rated voltage.

14. The method of claim 12, wherein the dimming of the LED channel or determining the LED channel to be in the short circuit state according to the result of comparison includes determining the LED channel to be short circuited when a time for the sense voltage corresponding to the output voltage to reach a second reference voltage corresponding to the threshold voltage is within the short circuit sense period.

15. The method of claim 12, wherein the dimming of the LED channel or determining the LED channel to be short circuited according to the result of the comparison includes dimming the LED channel when a time for the sense voltage corresponding to the output voltage to reach a second reference voltage corresponding to the threshold voltage is not within the short circuit sense period.

16. A device comprising:
a power supply for receiving an input voltage and supplying an output voltage needed for an operation of a load according to a switching operation of a power switch;
a power controller for controlling the output voltage;
a load switch connected between the load and the power supply; and
a short circuit sense protector for determining the load to be short circuited when the output voltage is reduced to a predetermined threshold voltage for a predetermined short circuit sense period from a time when the output voltage reaches a regulated voltage before the load is operated,
wherein during the short circuit sense period, the power controller stops the power supply from supplying the output voltage and the short circuit sense protector turns on the load switch.

17. The device of claim 16, further comprising:
a first sense comparator for comparing a sense voltage corresponding to the output voltage and a first reference voltage corresponding to the regulated voltage;
a second sense comparator for comparing the sense voltage and a second reference voltage corresponding to the threshold voltage;
a first sense switch for controlling a connection between the first sense comparator and the sense voltage; and
a second sense switch for controlling a connection between the second sense comparator and the sense voltage.

18. The device of claim 17, wherein the short circuit sense protector turns on the first sense switch while the output voltage is generated to reach the regulated voltage, and it turns on the second sense switch during the short circuit sense period starting from the time when the output voltage reaches the regulated voltage.

19. A method for driving a load, comprising:
receiving an input voltage and increasing an output voltage to a predetermined rated voltage;
stopping a generation operation of the output voltage during a predetermined short circuit sense period starting from a time when the output voltage reaches the rated voltage; and determining the load to be in the short circuit state according to a result of comparing the output voltage and a predetermined threshold voltage during the short circuit sense period.

20. The method of claim 19, wherein
determining the load to be in the short circuit state comprises determining the load to be short circuited when the time for the sense voltage corresponding to the output voltage to reach the second reference voltage corresponding to the threshold voltage is within the short circuit sense period.

* * * * *